(12) United States Patent
Fujitsuka

(10) Patent No.: US 11,402,825 B2
(45) Date of Patent: Aug. 2, 2022

(54) INFORMATION PROCESSING DEVICE, CONTROL METHOD THEREOF, AND CONTROL PROGRAM

(71) Applicant: NEC CORPORATION, Tokyo (JP)

(72) Inventor: Masashi Fujitsuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 989 days.

(21) Appl. No.: 16/086,093

(22) PCT Filed: Feb. 3, 2017

(86) PCT No.: PCT/JP2017/003996
§ 371 (c)(1),
(2) Date: Sep. 18, 2018

(87) PCT Pub. No.: WO2017/163629
PCT Pub. Date: Sep. 28, 2017

(65) Prior Publication Data
US 2020/0293027 A1    Sep. 17, 2020

(30) Foreign Application Priority Data

Mar. 25, 2016   (JP) .............................. JP2016-061291

(51) Int. Cl.
*G05B 19/418* (2006.01)
(52) U.S. Cl.
CPC .. *G05B 19/418* (2013.01); *G05B 2219/31372* (2013.01)
(58) Field of Classification Search
CPC .............................. G05B 19/418; G06F 17/60
See application file for complete search history.

(56) References Cited

U.S. PATENT DOCUMENTS 7,346,532 B2 *  3/2008  Kusama ................. G06Q 10/10
                                                     705/7.26
7,769,617 B2 *  8/2010  Iwasaki .......... G06Q 10/063116
                                                     705/7.26
(Continued)

FOREIGN PATENT DOCUMENTS

JP        2000-331069 A      11/2000
JP        2003-030389 A       1/2003
(Continued)

OTHER PUBLICATIONS

International Search Report for PCT/JP2017/003996 dated Feb. 28, 2017 [PCT/ISA/210].

*Primary Examiner* — Bryan Bui
(74) *Attorney, Agent, or Firm* — Sughrue Mion, PLLC

(57) ABSTRACT

An information processing system includes a storage which stores a plurality of operators, in association with current operations and work histories; a detection unit which detects an anomaly; an anomaly responder determination unit which determines a first operator who is intended to respond to the anomaly, from among the plurality of operators who are stored in the storage, on the basis of the work histories; an operation assignment unit which carries out an assignment of a new operation cluster upon a second operator, an unfulfilled operation identification unit which identifies an unfulfilled operation which has arisen due to the first operator responding to the anomaly; and an operator determination unit which determines an operator who is intended to respond to the unfulfilled operation on the basis of the current operations of each of the operators which are stored in the storage.

8 Claims, 14 Drawing Sheets

(56) References Cited

U.S. PATENT DOCUMENTS

2002/0016752 A1    2/2002   Suh
2002/0169752 A1   11/2002   Kusama et al.
2005/0209902 A1    9/2005   Iwasaki et al.

FOREIGN PATENT DOCUMENTS

| | | |
|---|---|---|
| JP | 2009-128918 A | 6/2009 |
| JP | 2014-191390 A | 10/2014 |
| WO | 2004/040388 A1 | 5/2004 |
| WO | 2012/090624 A1 | 7/2012 |
| WO | 2013/024613 A1 | 2/2013 |
| WO | 2013/080316 A1 | 6/2013 |
| WO | 2015/037118 A1 | 3/2015 |

* cited by examiner

Fig. 4

| OPERATION CLASSIFICATION (FOR EXAMPLE, WITH RESPECT TO EACH OPERATION RELATING TO CERTAIN EQUIPMENT) | CONTENTS | | CONDITION OF IMPLEMENTATION OF OPERATION (PRESENCE/ABSENCE) | PRIORITY | OPERATION NO. |
|---|---|---|---|---|---|
| | OBJECT (WHAT) | OPERATION (HOW) | | | |
| A | SENSOR 1 | | | | A_1_1 |
| A | SENSOR 1 | | | | A_1_2 |
| A | SENSOR 2 | | | | A_2_1 |
| A | SENSOR 2 | | | | A_2_2 |
| B | ... | ... | | | B_1_1 |
| ... | | | | | ... |

| OPERATOR | OPERATION NO. | EXPERIENCE | | |
|---|---|---|---|---|
| | | PRESENCE/ ABSENCE OF OPERATION EXPERIENCE | EXPERIENCE VALUE | ANOMALY RESPONDING EXPERIENCE |
| a | A_1_1 | | | |
| b | | | | |
| ... | | | | |

Fig. 6

| OPERATOR | CURRENT OPERATION NO. | POSITION INFORMATION | DEGREE OF IMPORTANCE |
|---|---|---|---|
| a | A_12 | ~ | 1 |
| b |  |  | 2 |
| ... | ... | ... | ... |

| INDEX | | WEIGHT |
|---|---|---|
| $A_1$ | (DISTANCE) | 0.1 |
| $A_2$ | (WORK HISTORY) | 0.5 |
| $A_3$ | (OPERATION PRIORITY) | 0.4 |

Fig. 8

| WORK HISTORY | | WEIGHT |
|---|---|---|
| (ANOMALY RESPONDING EXPERIENCE) | $B_1$ | 0.8 |
| (OPERATION SKILL RELATING TO ANOMALY OCCURRENCE EQUIPMENT) | $B_2$ | 0.2 |

Fig. 9

| OPERATION PRIORITY | | WEIGHT |
|---|---|---|
| $C_1$ (URGENCY) | | 0.5 |
| $C_2$ (NUMBER OF NODES FOLLOWING CURRENT OPERATION) | | 0.3 |
| $C_3$ (OPERATION LEVEL) | | 0.2 |

Fig. 10

| OPERATOR | CURRENT POSITION (FROM GPS) | OPERATION | | | WORK HISTORY | |
|---|---|---|---|---|---|---|
| | | EQUIPMENT | OPERATION NO. | | OPERATION SKILL (1~5) | ANOMALY RESPONDING EXPERIENCE (0/1) |
| a | | A | A_1_1 | | 3 | 0 |
| | | ... | A_2_1 | | 4 | 0 |
| b | | A | A_1_1 | | 4 | 1 |
| | | ... | A_2_1 | | 4 | 1 |
| ... | | | | | | |

| OPERATION CLASSIFICATION (FOR EXAMPLE, WITH RESPECT TO EACH OPERATION RELATING TO CERTAIN EQUIPMENT) | CONTENTS | | PRESENCE/ABSENCE OF CONDITION OF IMPLEMENTATION OF OPERATION (0/1) | OPERATION PRIORITY | | | OPERATION NO. |
|---|---|---|---|---|---|---|---|
| | OBJECT (WHAT) | OPERATION (HOW) | | URGENCY (0/1) | NUMBER OF SUBSEQUENT NODES | OPERATION LEVEL (1~5) | |
| A | 1 | | 0 | 1 | 15 | 3 | A_1_1 |
| | 2 | | 0 | 1 | 8 | 2 | A_2_1 |
| B | 1 | | 1 | 0 | 12 | 3 | B_1_1 |
| | 2 | | 1 | 0 | 10 | 2 | B_1_2 |
| | ... | ... | | | | | B_2_2 |
| ... | ... | ... | | | | | ... |

Fig. 12

| VERTEX 1 (OPERATION NO.) | VERTEX 2 (RELATED OPERATION NO.) | DIRECTION (ORDER) |
|---|---|---|
| A_1_1 | A_1_2 | ↑ |
| | A_1_3 | ↓ |
| | B_1_4 | NONE |
| ... | ... | ... |

213

INFORMATION PROCESSING DEVICE, CONTROL METHOD THEREOF, AND CONTROL PROGRAM

CROSS REFERENCE TO RELATED APPLICATIONS

This application is a National Stage of International Application No. PCT/JP2017/003996 filed Feb. 3, 2017, claiming priority based on Japanese Patent Application No. 2016-061291 filed Mar. 25, 2016, the entire contents of which are incorporated herein by reference.

Technical Field

The present invention relates to an information processing device, a control method thereof, and a control program.

Background Art

In the above technical field, PTL 1 to PTL 6 disclose management systems which assign operations to operators.

Citation List

Patent Literature

PTL 1: JP 2014-191390 A
PTL 2: JP 2000-331069 A
PTL 3: WO2012/090624
PTL 4: WO2013/024613
PTL 5: WO2015/037118
PTL 6: WO2013/080316

SUMMARY OF INVENTION

Technical Problem

In the techniques disclosed in the above documents, however, when an anomaly abruptly occurs, an operation assignment in the entirety of a plurality of operators cannot be optimized, and manufacturing efficiency is low.

The object of the present invention is to provide a technique which solves the above-described problem.

Solution to Problem

In order to solve the above problem, an information processing system according to the present invention includes: storage means for storing, by associating, a plurality of operators, current operations and work histories; receiving means for receiving a detection notification of an anomaly; anomaly responder determination means for determining, based on the work histories, a first operator who is intended to respond to the anomaly, from among the plurality of operators stored in the storage means; operation assignment means for carrying out an assignment of a new operation cluster to a second operator who had been engaged in an interrupted operation which could not be advanced due to the occurrence of the anomaly; unfulfilled operation identification means for identifying an unfulfilled operation which has arisen due to the first operator responding to the anomaly; and operator determination means for determining an operator who is intended to respond to the unfulfilled operation, based on the current operations of each of the operators stored in the storage means.

In order to solve the above problem, a control method of an information processing system including storage means for storing, by associating, a plurality of operators, current operations and work histories, the control method according to the present invention includes: a reception step of receiving a detection notification of an anomaly; an anomaly responder determination step of determining, based on the work histories, a first operator who is intended to respond to the anomaly, from among the plurality of operators stored in the storage means; an operation assignment step of carrying out an assignment of a new operation cluster to a second operator who had been engaged in an interrupted operation which could not be advanced due to the occurrence of the anomaly; an unfulfilled operation identification step of identifying an unfulfilled operation which has arisen due to the first operator responding to the anomaly; and an operator determination step of determining an operator who is intended to respond to the unfulfilled operation, based on the current operations of each of the operators stored in the storage means.

In order to solve the above problem, a control program of an information processing system including storage means for storing, by associating, a plurality of operators, current operations and work histories according to the present invention, the control program causing the information processing system to execute: a reception step of receiving a detection notification of an anomaly; an anomaly responder determination step of determining, based on the work histories, a first operator who is intended to respond to the anomaly, from among the plurality of operators stored in the storage means; an operation assignment step of carrying out an assignment of a new operation cluster to a second operator who had been engaged in an interrupted operation which could not be advanced due to the occurrence of the anomaly; an unfulfilled operation identification step of identifying an unfulfilled operation which has arisen due to the first operator responding to the anomaly; and an operator determination step of determining an operator who is intended to respond to the unfulfilled operation, based on the current operations of each of the operators stored in the storage means.

Advantageous Effects of Invention

According to the present invention, the manufacturing efficiency of a plant at a time when an anomaly occurs can be improved.

BRIEF DESCRIPTION OF DRAWINGS

FIG. 4 is a view illustrating an example of a first table used in the information processing system according to the second example embodiment of the present invention;

FIG. 5 is a view illustrating an example of a second table used in the information processing system according to the second example embodiment of the present invention;

FIG. 6 is a view illustrating an example of a third table used in the information processing system according to the second example embodiment of the present invention;

FIG. 7 is a view illustrating an example of a fourth table used in the information processing system according to the second example embodiment of the present invention;

FIG. 8 is a view illustrating an example of a fifth table used in the information processing system according to the second example embodiment of the present invention;

FIG. 9 is a view illustrating an example of a sixth table used in the information processing system according to the second example embodiment of the present invention;

FIG. 10 is a view illustrating an example of a seventh table used in the information processing system according to the second example embodiment of the present invention;

FIG. 11 is a view illustrating an example of an eighth table used in the information processing system according to the second example embodiment of the present invention;

FIG. 12 is a view illustrating an example of a ninth table used in the information processing system according to the second example embodiment of the present invention;

EXAMPLE EMBODIMENT

Figure 1:
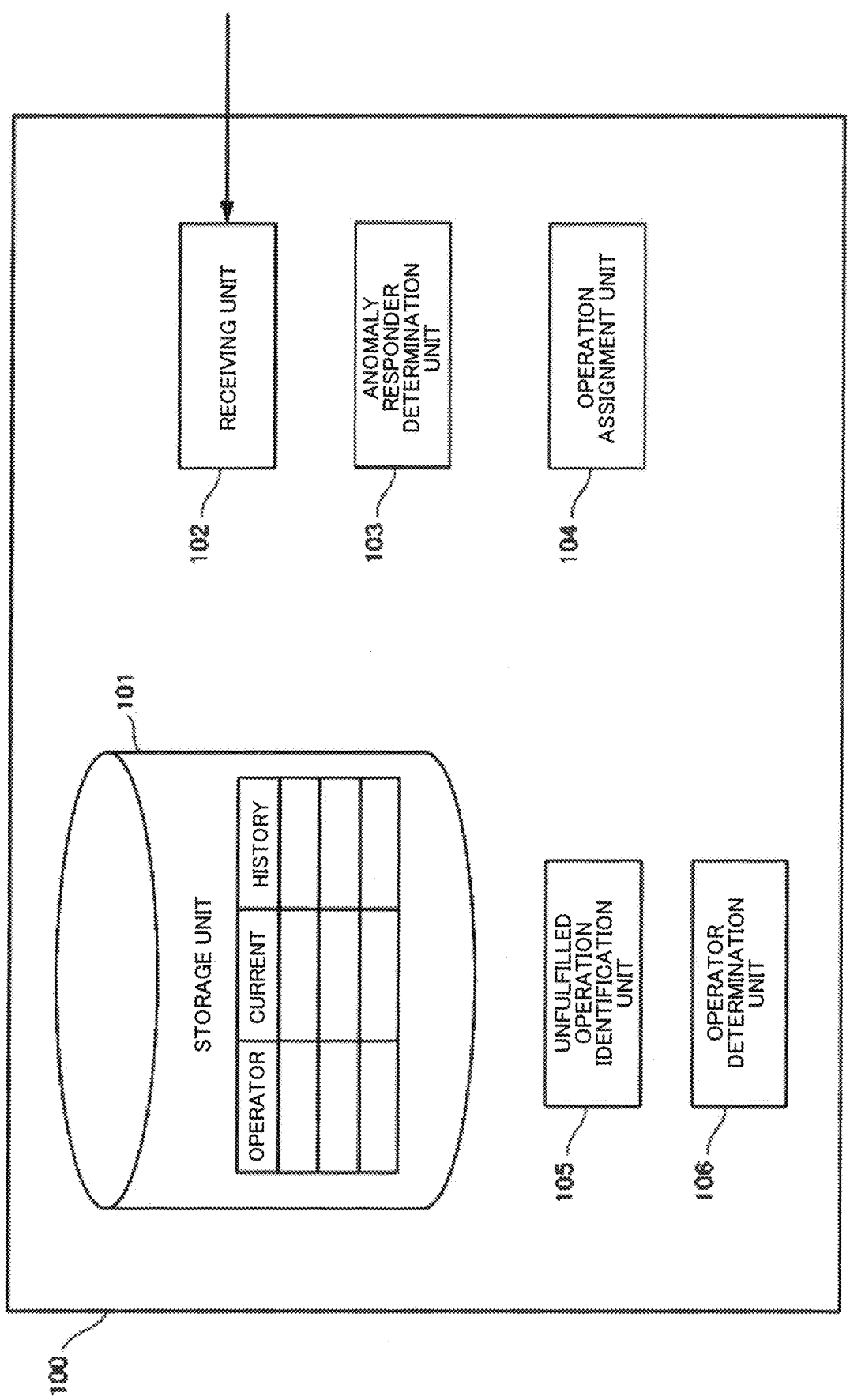
FIG. 1 is a block diagram illustrating a configuration of an information processing system according to a first example embodiment of the present invention.

Hereinafter, referring to the drawings, example embodiments of the present invention will be illustratively described in detail. However, the structural elements described in the example embodiments are merely illustrative examples, and it is not intended that the technical scope of the present invention is limited to them.

First Example Embodiment

An information processing system 100 as a first example embodiment of the present invention will be described with reference to FIG. 1. The information processing system 100 is a system for carrying out an assignment of an operator when an anomaly occurs.

As illustrated in FIG. 1, the information processing system 100 includes a storage unit 101, a receiving unit 102, an anomaly responder determination unit 103, an operation assignment unit 104, an unfulfilled operation identification unit 105, and an operator determination unit 106.

The storage unit 101 stores, by associating, operators, current operations and work histories. The receiving unit 102 receives a detection notification of an anomaly. The anomaly responder determination unit 103 determines an operator who is intended to respond to the anomaly, based on the work histories stored in the storage unit 101.

The operation assignment unit 104 carries out an assignment of a new operation cluster to an operator who had been engaged in an interrupted operation which could not be advanced due to the occurrence of the anomaly.

The unfulfilled operation identification unit 105 identifies an unfulfilled operation which has arisen due to the operator responding to the anomaly.

The operator determination unit 106 determines an operator who is intended to respond to the unfulfilled operation, based on the current operations of each of the operators stored in the storage unit 101.

According to the above configuration, even when an anomaly occurred, the manufacturing efficiency of the entirety of operations can be improved.

Second Example Embodiment (Background)

In general, in a plant, operators at site carry out operations, based on operation instruction documents, under the supervision (control) of a site supervisor. However, a problem arises when an anomaly that is to be quickly coped with has occurred.

Specifically, proper selection of an operator who can respond to the anomaly and instructions to change other operations due to the anomaly are required. At this time, it is desired that efficient and effective re-assignment of operations be executed so that an error of judgment and time loss due to manual work may not occur.

In particular, there are many problems, such as uselessness in the number of steps due to waiting for instructions, and an increase in the rate of occurrence of errors due to performing operations different from the operation instruction document because of the change of operations.

It is necessary for the site supervisor to give proper instructions corresponding to the anomaly to the entirety of operators, and for the operators to exactly perform operations, based on new operation instruction documents.

(Outline of Example Embodiment)

A database is constituted which includes a list of all thinkable operations, connections (with directions) between these elements, and work histories of respective operators at site, and the like. In addition, an operation instruction document of each operator is created based on the database.

When some anomaly was detected by an anomaly detection system, operations relating to the anomaly are associated based on the database, and an operation, which cannot be fulfilled due to the influence of the anomaly of this time, and an operation, which can be fulfilled, are judged.

By utilizing the data such as the work histories of respective operators, data of position information, priorities of operations, etc., an optimal operator who responds to the anomaly is selected, and an operation instruction document of each operator is optimally generated in the entirety of plant operations, based on the goal of the original instruction document.

A changed operation instruction document is quickly presented by a mobile terminal such as a tablet. When an anomaly occurred, information of disposition of an optimal operator, who can respond, is given. An operation instruction document of each optimal operator in the entirety of plant operations is generated (total optimization), with consideration given to the relationship between operators.

(Concrete Configuration of Example Embodiment)

Figure 2:
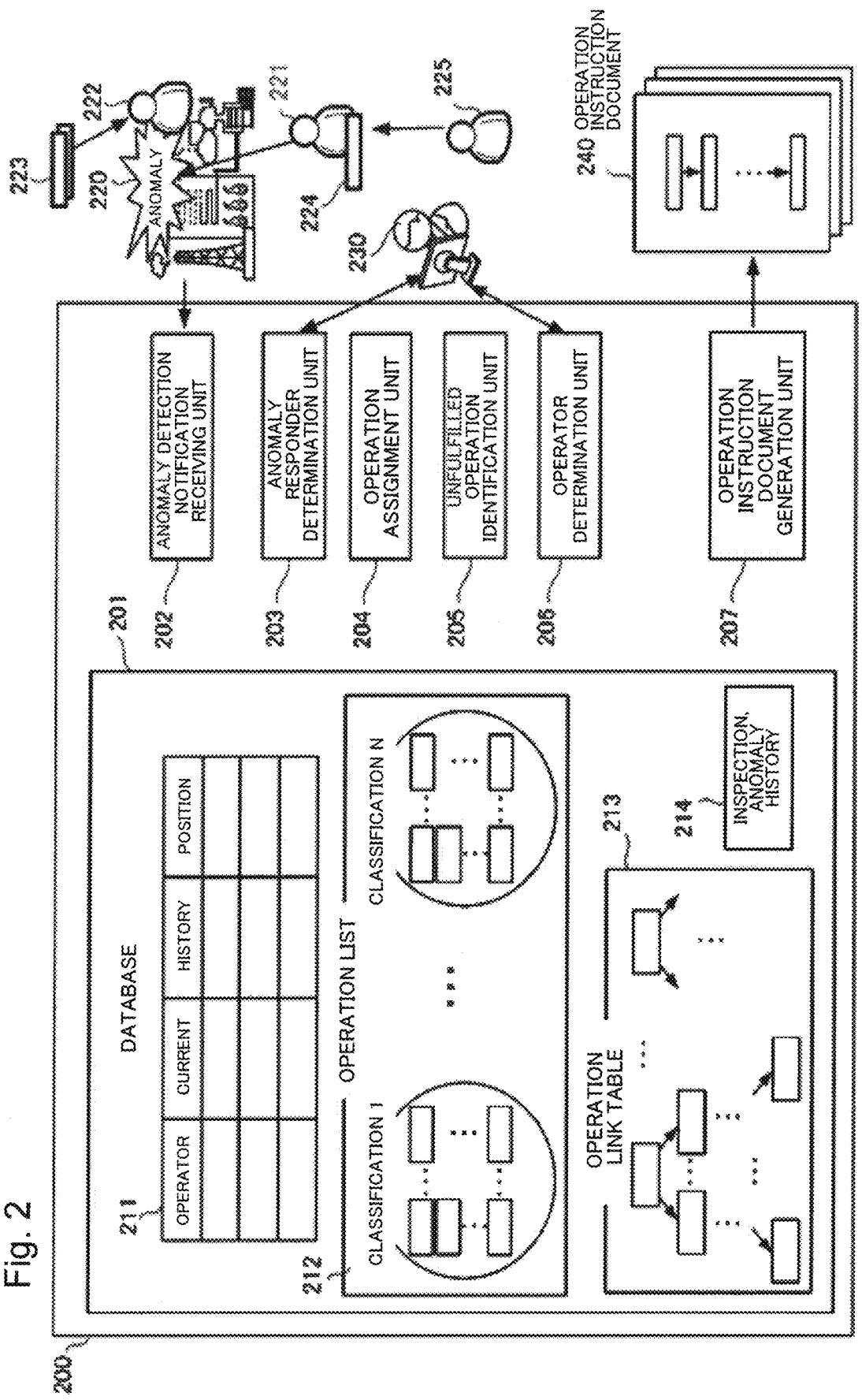
FIG. 2 is a block diagram illustrating a configuration of an information processing system according to a second example embodiment of the present invention.

Next, an information processing system 200 according to a second example embodiment of the present invention will be described with reference to FIG. 2 onwards. FIG. 2 is a view for describing a functional configuration of the information processing system 200 according to the present example embodiment.

The information processing system 200 includes a database 201, an anomaly detection notification receiving unit 202, an anomaly responder determination unit 203, an operation assignment unit 204, an unfulfilled operation identification unit 205, an operator determination unit 206 and an operation instruction document generation unit 207.

The database 201 includes an operator table 211 which stores, by associating, an identifier of each of a plurality of operators, current operations, work histories and current positions; an operation list 212 which classifies operations; an operation link table 213 indicating connections of respective operations; and an inspection anomaly history 214.

The anomaly detection notification receiving unit 202 receives a detection notification of an anomaly 220 which occurred in the plant. The anomaly responder determination unit 203 determines an operator 221 who is to respond to the anomaly 220 from among a plurality of operators stored in the database 201, based on the work histories.

The operation assignment unit 204 carries out an assignment of a new operation cluster 223 to an operator 222 who had been engaged in an interrupted operation which could not be advanced due to the occurrence of the anomaly 220.

The unfulfilled operation identification unit 205 identifies an unfulfilled operation 224 which has arisen due to the operator 221 responding to the anomaly 220. Further, the operator determination unit 206 determines an operator 225 who is intended to respond to the unfulfilled operation 224, based on the current operations of each of the operators who are stored.

The anomaly responder determination unit 203 determines the operator 221, based on the distance from the current position of each operator to the location of the anomaly. Specifically, when there are operators having substantially equal abilities to respond to the anomaly, the operator at a shorter distance is preferentially assigned to the responding to the anomaly. Furthermore, the anomaly responder determination unit 203 determines the operator 221, based on the priorities of the current operations of the plural operators. Specifically, the anomaly responder determination unit 203 creates a candidate list of operators 221 who are to respond to the anomaly 220, based on the work histories of the operators stored in the database 201, accepts an input from an operator 230, and determines the operator 221.

The operation assignment unit 204 creates a list of new operation cluster candidates which are to be assigned to the operator 222 who had been engaged in an interrupted operation which could not be advanced due to the occurrence of the anomaly 220, accepts an input from the operator 230, and determines the new operation cluster 223.

The operator determination unit 206 compares the priority of the unfulfilled operation 224 and the priorities of the current operations of each operator stored in the database 201, creates a list of operators who are engaged in operations with lower priorities than the unfulfilled operation 224, accepts an input from the operator 230, and determines the operator 225 who is intended to respond to the unfulfilled operation 224.

The operation instruction document generation unit 207 integrates the determined operators 221, 222 and 225 and operations 224 and 223, etc., and newly generates operation instruction documents 240.

By the above, it becomes possible to quickly and optimally perform the design of disposition of operators of each facility, and the movement of operators to operation sites, to shorten the manufacturing time, and improve the manufacturing capability and the operating efficiency of the facility.

By making machines carry out operations which were done by manual work, it becomes possible to reduce errors and enhance the efficiency of operations. Based on the anomaly that occurred, changes to operation instruction documents of each operator can optimally be generated. By mobile terminals such as tablets, new operation instruction documents are displayed and changes are notified to the operators. In the process of generating the operation instruction documents, the data of the work histories and position information of the respective operators are used, and thereby the operator who can respond to the anomaly is optimally selected. In addition, an operation, which cannot be continued due to the anomaly, is judged, and the optimal operation instruction document (operation process) of each operator is generated based on the present status and the goal of the entirety of operations.

Thereby, instructions to a proper operator corresponding to the anomaly become possible, and the efficiency of operations can be enhanced. In addition, an operation, which an operator himself/herself should do due to the anomaly, become clear, and the number of steps due to waiting for instructions can be reduced. Moreover, even after the occurrence of the anomaly, the operations based on operation instruction documents can be performed, and the rate of occurrence of errors can be decreased.

Figure 3:
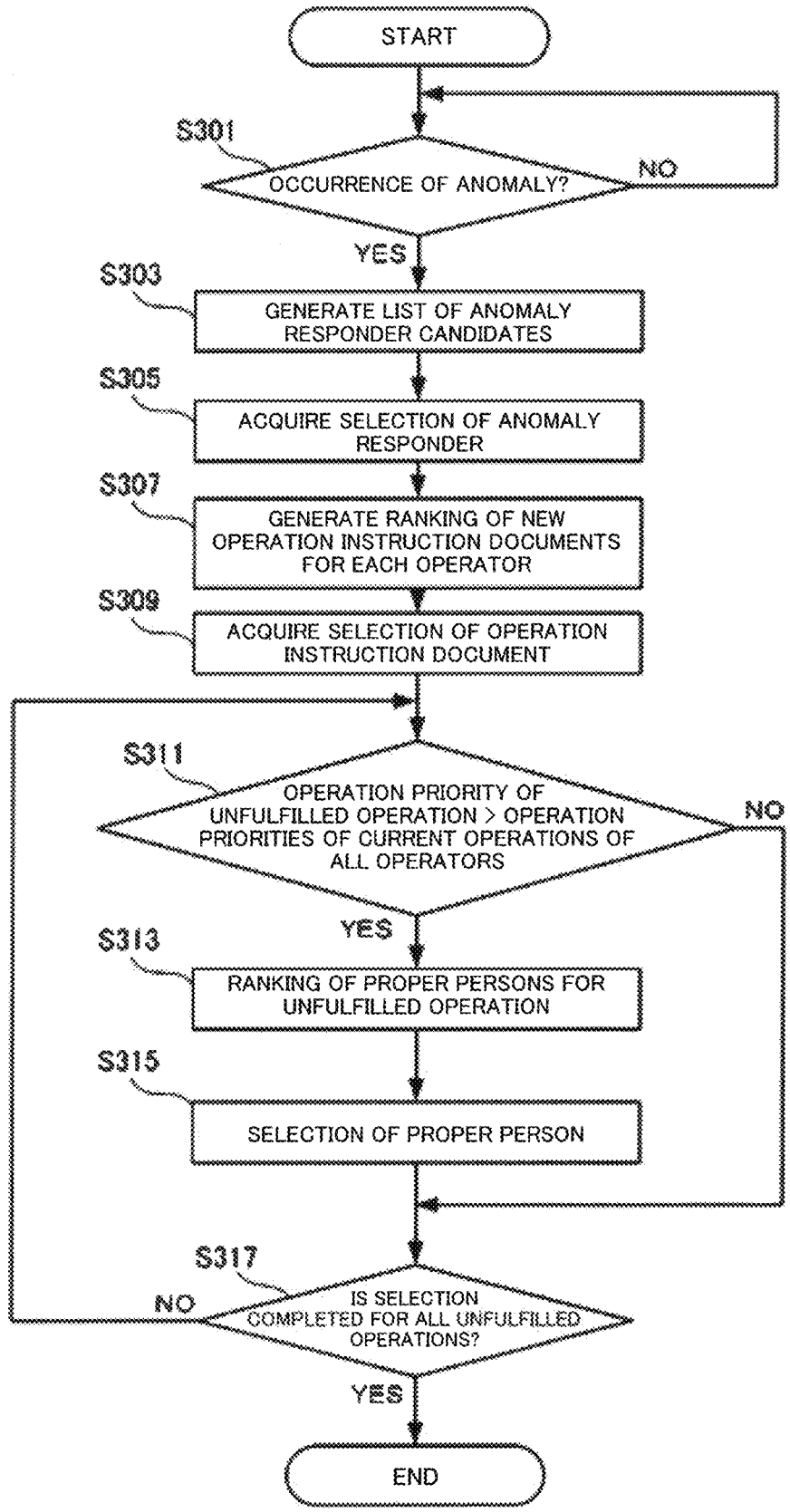
FIG. 3 is a flowchart illustrating the flow of a process of the information processing system according to the second example embodiment of the present invention.

FIG. 3 is a flowchart for describing the flow of a process in the information processing system 200. To start with, in step S301, if the anomaly detection notification receiving unit 202 detects occurrence of an anomaly, the process advances to step S303. In step S303, the anomaly responder determination unit 203 generates a ranking of proper anomaly responders. Specifically, the anomaly responder determination unit 203 evaluates the operation, in connection with which the anomaly occurred, by using the information of the operator list 212 as illustrated in FIG. 4. The anomaly responder determination unit 203 evaluates the content of the operation, the status of implementation of the operation, and the priority of the operation. Next, referring to an operator table 211a as illustrated in FIG. 5, the anomaly responder determination unit 203 determines what experience each operator had in the past, and what level of ability to cope with the anomaly each operation has. Further, using an operator table 211b as illustrated in FIG. 6, the anomaly responder determination unit 203 evaluates the degree of importance and the position of the operation which each operator is currently carrying out.

As an example, selection of an operator, who can respond to the anomaly, is executed based on the following linear index which is determined from the data such as the work history, position information, current operation priority, etc.

Index=−$A1$*(distance)+$A2$*(work history)−$A3$*(operation priority)where (distance)=(distance from present location to anomaly occurrence location)/(farthest distance), (work history)=$B1$*(anomaly responding experience (0/1))+$B2$*(operation skill relating to anomaly occurrence equipment (1~5))/5, (operation priority)=$C1$*(urgency (0/1))+$C2$*(number of nodes following current operation)/(total node number)+$C3$*(operation level (1-5))/5.

A1~A3, B1, B2, and C1~C3 are constants of from 0 to 1, and satisfy the following equation:

$$\sum_{i=1}^{3} A_i = \sum_{i=1}^{2} B_i = \sum_{i=1}^{3} C_i = 1$$

The above indices are calculated for all operators, and are ranked in the order beginning with the highest value.

Note that the (distance from present location to anomaly occurrence location) is calculated, for example, by measuring the position of each operator by a GPS.

In addition, the (farthest distance) is a distance which is thought to be longest in the plant.

The (work history) is evaluated by using the following quantities with respect to the operators.

The (anomaly responding experience) is expressed by a binary value of 0 or 1, which represents the presence/absence of this experience.

The (operation skill relating to anomaly occurrence equipment) is expressed by five-grade evaluation (1~5).

The (operation priority) is evaluated by using the following quantities with respect to the operation which the operator is currently carrying out.

The (urgency) is expressed by a binary value of 0 or 1, which represents whether the operation can be interrupted or not.

The (number of nodes following current operation) becomes an index of a risk in a case in which the operation can no longer be carried out.

The (operation level) represents a level (difficulty level) required for the operation by five-grade evaluation (1~5).

As a concrete example, weight constants of the index are selected as illustrated in FIG. 7 to FIG. 9. FIG. 7 is a view illustrating weight constants of the distance, work history and operation priority. Here, the highest importance is placed on the work history, and the next highest importance is placed on the operation priority. For example, in the case of an anomaly with urgency, A1, for instance, can be increased.

FIG. 8 is a view illustrating weight constants for each work history, and the highest importance is placed on the anomaly responding experience. For example, in the case of the purpose of education, B2, for instance, is increased.

FIG. 9 is a view illustrating weight constants for each operation priority, and a higher operation priority is selected as the urgency increases. In this case, too, the weight may be selected in accordance with the object and the purpose of use.

As the distance and work history, each operator is evaluated by using an operator table 1000 as illustrated in FIG. 10. For example, when an anomaly occurred in equipment A, the (work history) can be calculated as described below, if FIG. 10 is referred to. Note that when an anomaly occurs not as an operation number but as equipment, a mean is used.

(work history) of operator $a = 0.2*(3+4)/(2*5) + 0.8*0 = 0.14$ (work history) of operator $b = 0.2*4/5 + 0.8*1 = 0.96$ On the other hand, as the operation priority, each operation is evaluated by using an operation classification table 1100 as illustrated in FIG. 11.

For example, if the operator $a$ is doing a current operation A_1_1 and a total node number of a directed graph including this operation is 30, the operation priority of the operator $a$ is as follows.

(operation priority) $= 0.5*1 + 0.3*15/30 + 0.2*3/5 = 0.77$

When an anomaly occurred, the above index is calculated for each operator with respect to each operation. Basically, an operator with a high index in each operation is assigned to the operation. In this manner, a candidate list of operators who are intended to respond to the anomaly is generated in a ranking form.

Referring back to FIG. 3, in step S305, the anomaly responder determination unit 203 presents the list of anomaly responder candidates to the operator 230, acquires a selection of an anomaly responder from the list, and generates an operation instruction document for the determined anomaly responder. On this operation instruction document, where in the plant the anomaly occurs may be displayed by a map. Thereby, the relationship between the anomaly responder's own operation and the anomaly is made clearer.

Figure 13:
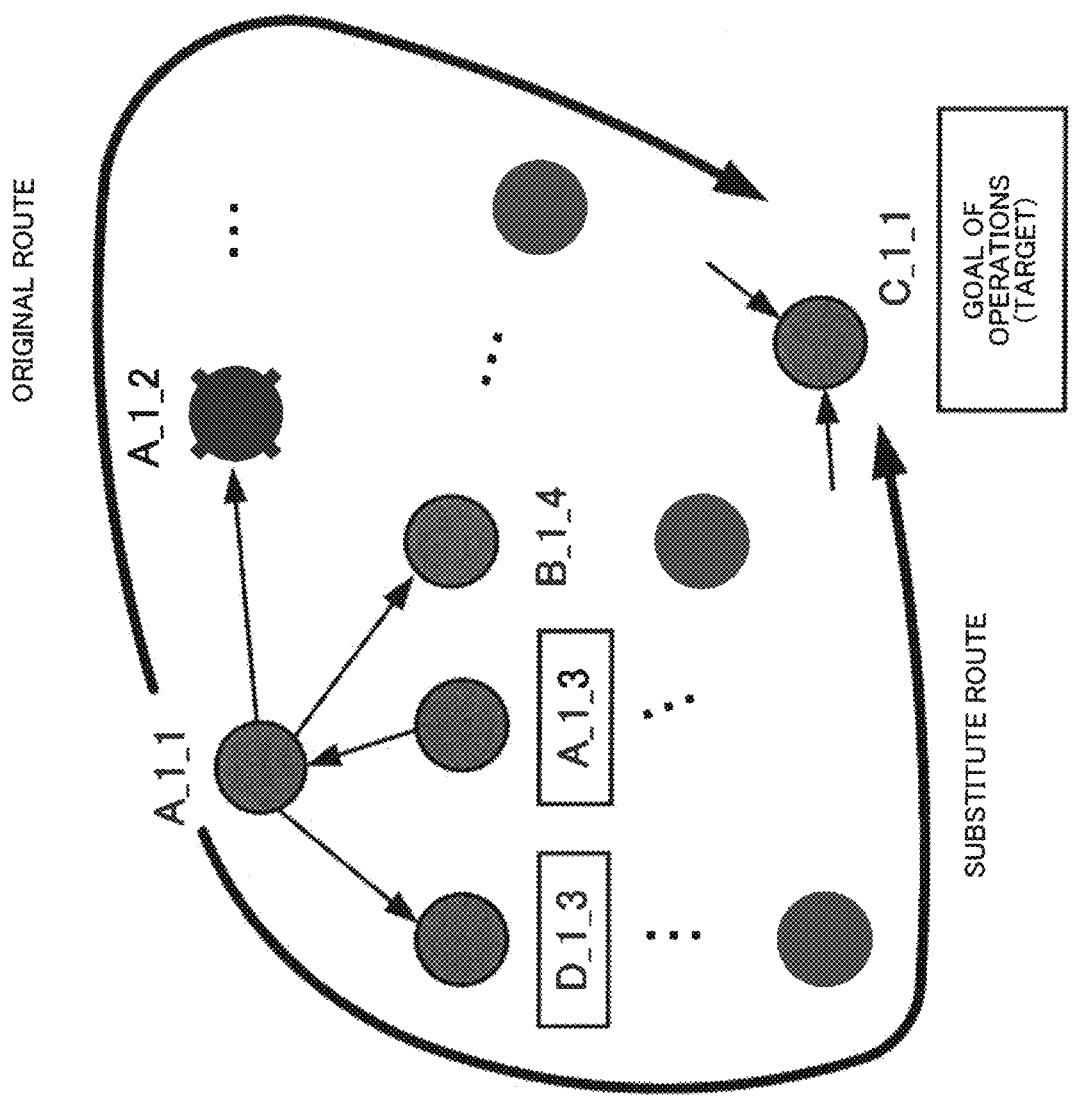
FIG. 13 is a view for describing the generation of an operation instruction document in the information processing system according to the second example embodiment of the present invention.
Figure 14:
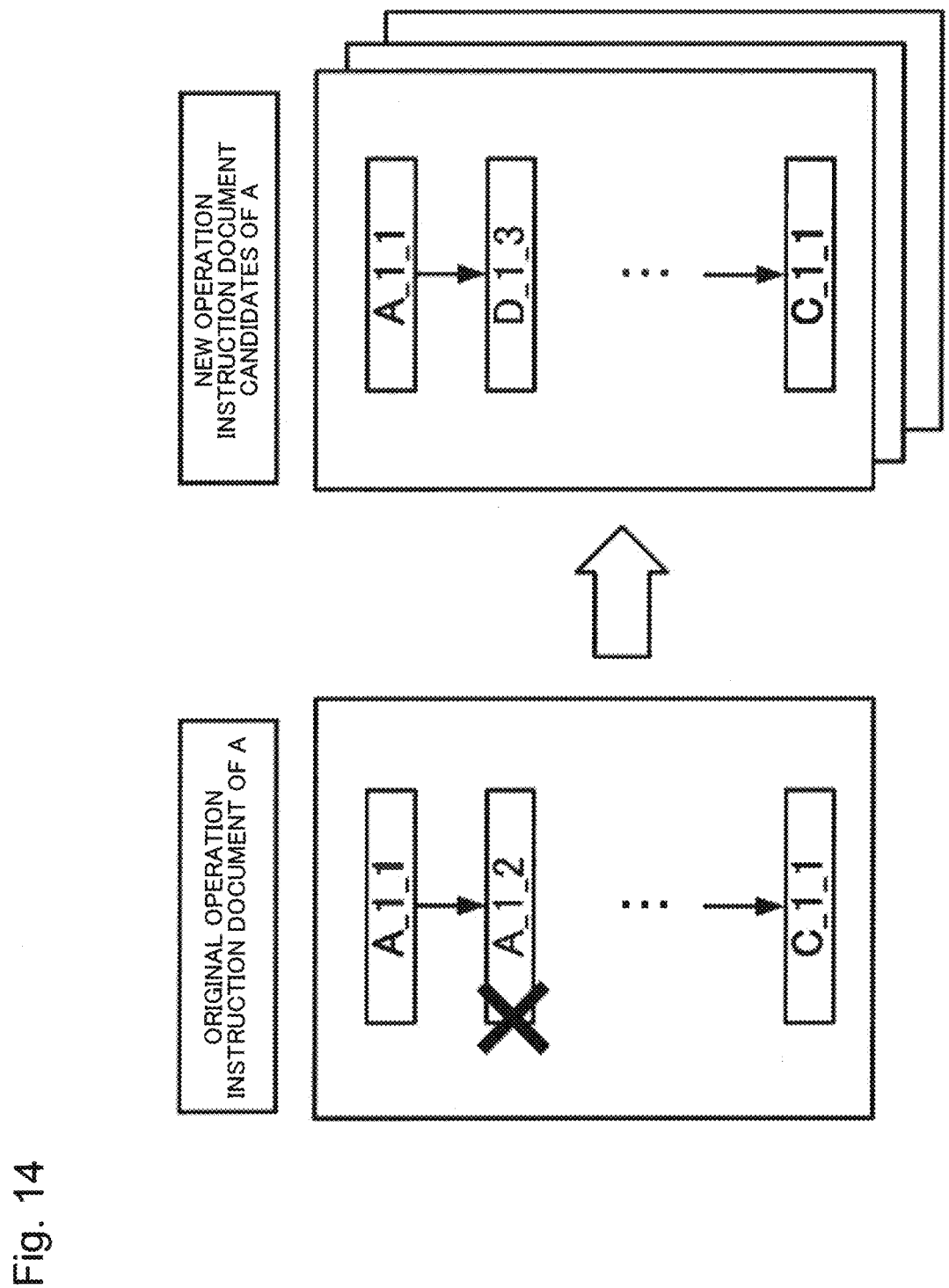
FIG. 14 is a view for describing the generation of another operation instruction documents in the information processing system according to the second example embodiment of the present invention.

Next, in step S307, taking into account the interrupted operation due to the anomaly, an operation instruction document of each operator is generated from the data of connections between respective operations, based on the goal (of each operation instruction document). Specifically, as illustrated in FIG. 12, by referring to the operation link table 213, it is determined which operation is associated with which operation, and how (in what order) the operations are associated. Then, as illustrated in FIG. 13, substitute routes to the goal of operations are listed up for an operation route which was interrupted due to the occurrence of the anomaly. Thereby, as illustrated in FIG. 14, a plurality of candidates of new operation instruction documents are generated.

Furthermore, by taking into account the index (e.g. the above-described linear index) determined from the data such as the work history of each operator, position information and current operation priority, a ranking indicating which operation will properly be performed by which operator is generated.

Specifically, a ranking is generated in an order beginning with a greatest sum of operation priorities of each operation instruction document.

New operation instruction document 1: the sum of operation priorities=M1,

New operation instruction document 2: the sum of operation priorities=M2,

New operation instruction document N: the sum of operation priorities=MN.

Besides, for example, when priority is placed on the speed of operations, it can be thought that the ranking is generated in the order beginning with a route with a shortest path.

In step S309, a selection of an optimal operation instruction document by the site supervisor is acquired from the list of operation instruction documents displayed in the ranking form.

In subsequent step S311, the operation priority of the unfulfilled operation is compared with the priorities of the current operations of all operators. Then, in step S313, a ranking of proper persons as operators, who will perform the unfulfilled operation, is generated.

The generation of the ranking in this case is substantially the same as the above-described process of generating the ranking of the proper anomaly responder. The only difference is that the anomaly responding experience is not included in the work history.

Index $= -A1*$(distance)$+A2*$(work history)$-A3*$(operation priority), where the value of each item is calculated as follows.

(distance)=(distance from present location to anomaly occurrence location)/(farthest distance), (work history)=$B1*$(operation skill relating to anomaly occurrence equipment (1~5))/5, (operation priority)=$C1*$(urgency (0 or 1))+$C2*$(number of nodes following current operation)/(total node number)+$C3*$(operation level (1~5))/5.

Next, in step S314, a selection by the operator from the thus generated list of operators, who are intended to respond to the unfulfilled operation, is acquired. In step S317, it is determined whether operators were determined for all unfulfilled operations. If there remains an unfulfilled operation, the operator determination unit 206 returns to step S311 and repeats the process. If there remains no unfulfilled operation, the operator determination unit 206 terminates the process.

As described above, in the present example embodiment, when an anomaly was detected in a plant, operations related to the anomaly are associated based the database, and an operation, which can no longer be performed due to the influence of the anomaly, and an operation, which can be performed, are judged. Further, based on the goal of the original operation instruction document, the data such as the work history of each operator, data of position information and the priorities of operations are utilized, and thereby the operation instruction document of each operator is optimally generated in the entirety of plant operations. In this process, selection of an optimal operator who responds to the anomaly is executed at the same time. If a mobile terminal such as a tablet is used, the changed operation instruction document can quickly be presented.

Thereby, when an anomaly occurred, the information of disposition of the optimal operator who can respond to the anomaly can be given, and the generation (total optimization) of the optimal operation instruction document of each operation in the entirety of plant operations can be performed, with consideration given to the relationship among the operators.

Other Example Embodiments

The present invention has been described above with reference to the example embodiments. However, the present invention is not limited to the above-described example embodiments. In the configuration and details of the present invention, various modifications, which are understandable by a skilled person within the scope of the present invention, can be made. Furthermore, a system or a device, in which different characteristics included in the respective example embodiments are variously combined, is also included within the scope of the present invention.

The present invention may be applied to a system which is composed of a plurality of pieces of equipment, or may be applied to a device as a single unit. Moreover, the present invention is applicable to a case in which an information processing program, which realizes the functions of the example embodiments, is supplied directly or remotely to a system or a device. Accordingly, a program, which is installed in a computer in order to realize the function of the present invention by the computer, or a medium storing the program, or a word wide web (WWW) server which downloads the program, is included within the scope of the present invention. In particular, at least, a non-transitory computer readable medium, which stores a program for causing a computer to execute process steps included in the above-described example embodiments, is included within the scope of the present invention.

The present application claims priority, based on Japanese Patent Application No. 2016-61291, filed Mar. 25, 2016; the entire contents of which are incorporated herein by reference.

The invention claimed is:

1. An information processing system comprising:
a storage storing, by associating, information of a plurality of operators, current operations, work histories, and an operation link table, wherein the operation link table indicates connections of respective operations;
a processor; and
a memory storing executable instructions that, when executed by the processor, causes the processor to perform as:
a receiving unit which receives a detection notification of an anomaly;
an anomaly responder determination unit which determines, based on the work histories, a first operator who is intended to respond to the anomaly, from among the information of plurality of operators stored in the storage;
an operation assignment unit which determines an interrupted operation based on the operation link table and carries out an assignment of a new operation cluster to a second operator who had been engaged in the interrupted operation, wherein the interrupted operation is an operation that could not be advanced due to the occurrence of the anomaly;
an unfulfilled operation identification unit which identifies an unfulfilled operation which has arisen due to the first operator responding to the anomaly; and
an operator determination unit which determines an operator who is intended to respond to the unfulfilled operation, based on the current operations of each of the operators stored in the storage.

2. The information processing system according to claim 1, wherein the storage further stores position information of each operator, and
the anomaly responder determination unit determines the first operator, further based on a distance from each operator to an anomaly location.

3. The information processing system according to claim 1, wherein the anomaly responder determination unit determines the first operator, further based on priorities of the current operations of the operators.

4. The information processing system according to claim 1, wherein the anomaly responder determination unit creates a candidate list of the first operator who is to respond to the anomaly, from the operators stored in the storage, based on the work histories, accepts an input from an operator, and determines the first operator.

5. The information processing system according to claim 1, wherein the operation assignment unit creates a list of new operation cluster candidates which are to be assigned to the second operator who had been engaged in the interrupted operation which could not be advanced due to the occurrence of the anomaly, accepts an input from an operator, and determines the new operation cluster.

6. The information processing system according to claim 1, wherein the operator determination unit compares a priority of the unfulfilled operation and priorities of the current operations of the operators stored in the storage, creates a list of operators who are engaged in operations with lower priorities than the unfulfilled operation, accepts an input from an operator, and determines the operator who is intended to respond to the unfulfilled operation.

7. A control method of an information processing system including storage storing, by associating, information of a plurality of operators, current operations work histories, and an operation link table, wherein the operation link table indicates connections of respective operations, the control method comprising:
receiving a detection notification of an anomaly;

determining, based on the work histories, a first operator who is intended to respond to the anomaly, from among the information of the plurality of operators stored in the storage;

determining an interrupted operation based on the operation link table and carrying out an assignment of a new operation cluster to a second operator who had been engaged in the interrupted operation, wherein the interrupted operation is an operation that could not be advanced due to the occurrence of the anomaly;

identifying an unfulfilled operation which has arisen due to the first operator responding to the anomaly; and determining an operator who is intended to respond to the unfulfilled operation, based on the current operations of each of the operators stored in the storage.

8. A non-transitory computer-readable recording medium on which a control program of an information processing system including storage storing, by associating, information of a plurality of operators, current operations and work histories is recorded, and an operation link table, wherein the operation link table indicates connections of respective operations, the control program causing a computer of the information processing system to execute:

receiving a detection notification of an anomaly;

determining, based on the work histories, a first operator who is intended to respond to the anomaly, from among the information of the plurality of operators stored in the storage;

determining an interrupted operation based on the operation link table and carrying out an assignment of a new operation cluster to a second operator who had been engaged in the interrupted operation, wherein the interrupted operation is an operation that could not be advanced due to the occurrence of the anomaly;

identifying an unfulfilled operation which has arisen due to the first operator responding to the anomaly; and determining an operator who is intended to respond to the unfulfilled operation, based on the current operations of each of the operators stored in the storage.

\* \* \* \* \*